United States Patent
Bookless et al.

(10) Patent No.: US 9,567,080 B2
(45) Date of Patent: Feb. 14, 2017

(54) GOAL-BASED PLANNING SYSTEM

(71) Applicant: BAE SYSTEMS plc, London (GB)

(72) Inventors: John Paterson Bookless, Bristol South Gloucestershire (GB); Markus Deittert, Bristol South Gloucestershire (GB); Richard Norman Herring, Chelmsford Essex (GB); Elizabeth Jane Cullen, Chelmsford Essex (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/888,222

(22) PCT Filed: May 2, 2014

(86) PCT No.: PCT/GB2014/051368
§ 371 (c)(1),
(2) Date: Oct. 30, 2015

(87) PCT Pub. No.: WO2014/177882
PCT Pub. Date: Nov. 6, 2014

(65) Prior Publication Data
US 2016/0068268 A1 Mar. 10, 2016

(30) Foreign Application Priority Data

May 2, 2013 (EP) ..................................... 13275108
May 2, 2013 (GB) .................................. 1307908.2

(51) Int. Cl.
*B64C 39/02* (2006.01)
*G06Q 10/00* (2012.01)
*G06Q 50/00* (2012.01)

(52) U.S. Cl.
CPC ............. *B64C 39/024* (2013.01); *G06Q 10/20* (2013.01); *G06Q 50/00* (2013.01); *B64C 2201/00* (2013.01)

(58) Field of Classification Search
CPC ... B64C 39/024; B64C 2201/00; G06Q 10/20; G06Q 50/00
(Continued)

(56) References Cited

U.S. PATENT DOCUMENTS 9,363,544 B2 * 6/2016 Tomita ............. H04N 21/26283
2007/0113235 A1 5/2007 De et al.
(Continued)

FOREIGN PATENT DOCUMENTS

EP 2645196 A1 10/2013
GB 2494047 A 2/2013
(Continued)

OTHER PUBLICATIONS

International Search Report and Written Opinion received for Patent Application No. PCT/GB2014/051368, mailed on Jun. 13, 2014. 11 pages.
(Continued)

*Primary Examiner* — McDieunel Marc
*Assistant Examiner* — James E Stroud
(74) *Attorney, Agent, or Firm* — Finch & Maloney PLLC (57) ABSTRACT

A method and apparatus for determining actions for entities (4, 6) such that a goal is accomplished constraints are satisfied. The method comprises: determining an initial plan comprising actions that, if performed by the entities (4, 6), the goal would be accomplished; determining that a constraint would not be satisfied if the initial plan was implemented; and iteratively performing steps (i) to (v) until a final plan that accomplishes the goal and satisfies the is determined. Step (i) comprises identifying a constraint that is not satisfied in part of the current plan. Step (ii) comprises determining a remedy that, if implemented, satisfies the identified constraint. Step (iii) comprises updating the goal specification to include the remedy. Step (iv) comprises,
(Continued)

using the updated goal specification, determining a further plan that accomplishes the goal and the remedy. Step (v) comprises determining whether or not the further plan satisfies each constraint.

20 Claims, 5 Drawing Sheets

(58) Field of Classification Search
USPC .............................................................. 701/3
See application file for complete search history.

(56) References Cited

U.S. PATENT DOCUMENTS

| | | | |
|---|---|---|---|
| 2009/0312871 A1* | 12/2009 | Lee .................. | G01C 21/00 700/259 |
| 2010/0205019 A1 | 8/2010 | Jung et al. | |
| 2011/0184604 A1 | 7/2011 | Franke et al. | |
| 2011/0283285 A1 | 11/2011 | Saad et al. | |
| 2015/0310362 A1* | 10/2015 | Huffman ............. | G06Q 50/22 705/2 |
| 2015/0339810 A1* | 11/2015 | Lim .................. | G06T 7/001 382/152 |
| 2016/0107646 A1* | 4/2016 | Kolisetty ............ | B60W 30/16 701/96 |
| 2016/0116889 A1* | 4/2016 | Zacharko ........... | G05B 13/0205 307/116 |
| 2016/0170735 A1* | 6/2016 | Kuo .................. | G06F 8/65 717/169 |

FOREIGN PATENT DOCUMENTS

| | | |
|---|---|---|
| WO | 2007080584 A2 | 7/2007 |
| WO | 2008070208 A2 | 6/2008 |
| WO | 2014177882 A1 | 11/2014 |

OTHER PUBLICATIONS

GB Intellectual Property Office Search Report under Section 17(5) received for GB Patent Application No. 1307908.2 mailed on Nov. 7, 2013. 2 pages.
EP Intellectual Property Office Extended Search Report received for EP Patent Application No. 13275108.2 mailed on Sep. 26, 2013. 10 pages.
Beard, R. and McLain, T., "Multiple UAV Cooperative Search under Collision Avoidance and Limited Range Communication Constraints," 2003 IEEE Conference on Decision and Control, 2003. 9 pages.
Ghallab, et al., "PDDL—The Planning Domain Definition Language," Technical Report CVC TR-98-003/DCS TR-1165, Oct. 1998. 27 pages.
Nguyen, et al., "Autonomous Communication Relays for Tactical Robots," Proceedings of the 11th International Conference on Advanced Robotics, ICAR, Jun. 30-Jul. 3, 2003. pp. 35-40.
Ponda, et al., "Avoid communication outages in decentralized planning," IEEE Globecom 2010 Workshop on Wireless Networking for Unmanned Aerial vehicles (UAVS), 2010. pp. 1756-1759.
Schouwenaars, et al., "Multi-Vehicle Path Planning for Non-Line of Sight Communication," Journal of Field Robotics, Mar. 2006. 33 pages.
International Preliminary Report on Patentabilty received for Patent Application No. PCT/GB2014/051368, mailed on Nov. 12, 2015. 9 pages.

* cited by examiner

GOAL-BASED PLANNING SYSTEM

FIELD OF THE INVENTION

The present invention relates to methods and apparatus for goal-based planning and control of systems.

BACKGROUND

It is known to use mission planning processes, or task planning processes, to determine tasks for entities such as vehicles to perform.

Many mission planning problems have complex and nonlinear constraints. Communication constraints are an example of such complex and nonlinear constraints.

Conventionally, when attempting to solve mission planning problems with complex and nonlinear constraints, either the nonlinear constraints are approximated with simpler linear constraints, or the size of the planning problem is reduced, for example, by using a receding horizon approach.

H. Nguyen, N. Pezeshkian, M. Raymond, A. Gupta, J. Spector, "*Autonomous Communication Relays for Tactical Robots*", Proceedings of the 11th International Conference on Advanced Robotics, 2003, discloses a system of ground robots, where specialist relay robots form a convoy together with a master robot. The relay robots take a fixed position when a rule-based system indicates that a relay is required for line-of-sight maintenance.

R. Beard, T. McLain, "*Multiple UAV Cooperative Search under Collision Avoidance and Limited Range Communication constraints*", 2003 IEEE Conference on Decision and Control, 2003, discloses reducing the size of a planning problem by approximating communication constraints using a simple range constraint between vehicles.

T. Schouwenaars, A. Stubbs, J. Paduano, E. Feron, "*Multivehicle path planning for nonline-of-sight communication*", Journal of Field Robotics, Vol. 23, Issue 3-4, pp. 269-290, 2006, discloses a mixed integer linear programming approach to constrain a path planning problem for a group of unmanned air vehicles (UAVs). In this approach only a short part of the mission is planned at a time. Also, the complexity of line-of-sight blocking obstacles that can be modelled is limited.

S. Ponda, O. Huber, H. Choi, J. How, "*Avoid communication outages in decentralized planning*", IEEE Globecom 2010 Workshop on Wireless Networking for UAVs, 2010, discloses a distributed planning system that tends to require strong communication connectivity between vehicles. In this approach, communication constraints are modelled as simple distance constraints. Also, with this approach, the use of specialist communication planning tools tends to be difficult.

SUMMARY OF THE INVENTION

In a first aspect, the present invention provides a method of determining actions to be performed by a plurality of physical entities such that a predetermined goal is accomplished and such that one or more predetermined constraints are satisfied, the method comprising: using a specification of the goal, determining, by a plan determination module, an initial plan, the initial plan comprising one or more actions, each of the one or more actions being assigned to an entity, the one or more actions being such that, if each entity performed the one or more actions assigned to that entity, the goal would be accomplished; using a specification of the one or more constraints, determining, by a plan analysis module, that one or more of the constraints would not be satisfied if the initial plan was implemented; and iteratively performing steps (i) to (v) until, at step (v), it is determined that each of the one or more predetermined constraints are satisfied, thereby providing a final plan that specifies actions to be performed by the plurality of entities such that the predetermined goal is accomplished and such that the one or more predetermined constraints are satisfied; wherein step (i) comprises identifying: a part of the current plan in which a constraint is not satisfied and a constraint that is not satisfied in the identified part of the current plan; step (ii) comprises determining, by a remedy determination module, a remedial action or a remedial constraint, the remedial action or remedial constraint being such that, if the remedial action or remedial constraint was to be implemented, the identified constraint would be satisfied in the identified part of the current plan; step (iii) comprises updating the current specification of the goal so as to include a specification for the determined remedial action or remedial constraint, thereby providing an updated specification of the goal; step (iv) comprises, using the updated specification of the goal, determining, by the plan determination module, a further plan, the further plan comprising one or more further actions, each of the one or more further actions being assigned to an entity, the one or more further actions being such that, if each entity performed the one or more further actions assigned to that entity, the goal would be accomplished; and step (v) comprises, using the specification of the one or more constraints, determining, by the plan analysis module, whether or not each of the one or more constraints would be satisfied if the further plan was to be performed.

The method may further comprise controlling the entities to perform the final plan and thereby accomplish the predetermined goal.

One or more of the entities may be an unmanned vehicle.

The one or more predetermined constraints may comprise a communication constraint relating to communication between an entity and a further entity remote from that entity.

The communication constraint relating to an entity may specify that a communication link between that entity and an entity remote from that entity is to be provided.

The step of determining the remedial action or remedial constraint may comprise determining a location for a communication relay that is to provide the communication link, for example, if it is determined that the communication constraint is not satisfied.

The communication constraint relating to an entity may specify a bandwidth limitation on communications sent from or received by that entity.

The step of determining the remedial action or remedial constraint may comprise determining a communication scheduling constraint, for example, if it is determined that the communication constraint is not satisfied.

The operation of one or more of the entities may be monitored by a human operator. The one or more predetermined constraints may comprise a constraint relating to a workload of the human operator.

The step of determining the remedial action or remedial constraint may comprise a workload scheduling constraint, for example, if it is determined that the constraint relating to the workload of the human operator is not satisfied.

A step of determining a plan may comprise: using the current specification of the goal, determining a plurality of tasks, the plurality of tasks being such that if each of those tasks were performed, the goal would be accomplished; assigning each of tasks to an entity; and, for each entity to which a task has been assigned, and for each task assigned to that entity, determining one or more actions. The one or more actions determined for an entity and for a task assigned to that entity may be such that, if those actions are performed by that entity, that entity would perform that task.

In a further aspect, the present invention provides apparatus for determining actions to be performed by a plurality of physical entities such that a predetermined goal is accomplished and such that one or more predetermined constraints are satisfied, the apparatus comprising: a plan determination module; a plan analysis module; and a remedy determination module; wherein the plan determination module is configured to, using a specification of the goal, determine an initial plan, the initial plan comprising one or more actions, each of the one or more actions being assigned to an entity, the one or more actions being such that, if each entity performed the one or more actions assigned to that entity, the goal would be accomplished; the plan analysis module configured to, using a specification of the one or more constraints, determine that one or more of the constraints would not be satisfied if the initial plan was implemented; and the plan determination module, plan analysis module, and the remedy determination module are configured to iteratively performing steps (i) to (v) until, at step (v), it is determined that each of the one or more predetermined constraints are satisfied, thereby providing a final plan that specifies actions to be performed by the plurality of entities such that the predetermined goal is accomplished and such that the one or more predetermined constraints are satisfied; wherein step (i) comprises identifying a part of the current plan in which a constraint is not satisfied, and a constraint that is not satisfied in the identified part of the current plan; step (ii) comprises determining, by a remedy determination module, a remedial action or a remedial constraint, the remedial action or remedial constraint being such that, if the remedial action or remedial constraint was to be implemented, the identified constraint would be satisfied in the identified part of the current plan; step (iii) comprises updating the current specification of the goal so as to include a specification for the determined remedial action or remedial constraint, thereby providing an updated specification of the goal; step (iv) comprises, using the updated specification of the goal, determining, by the plan determination module, a further plan, the further plan comprising one or more further actions, each of the one or more further actions being assigned to an entity, the one or more further actions being such that, if each entity performed the one or more further actions assigned to that entity, the goal would be accomplished; and step (v) comprises, using the specification of the one or more constraints, determining, by the plan analysis module, whether or not each of the one or more constraints would be satisfied if the further plan was to be performed.

The apparatus may further comprise an entity controller configured to control the entities so as to implement the determined further plan and thereby accomplish the predetermined goal.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

DETAILED DESCRIPTION

Figure 1:
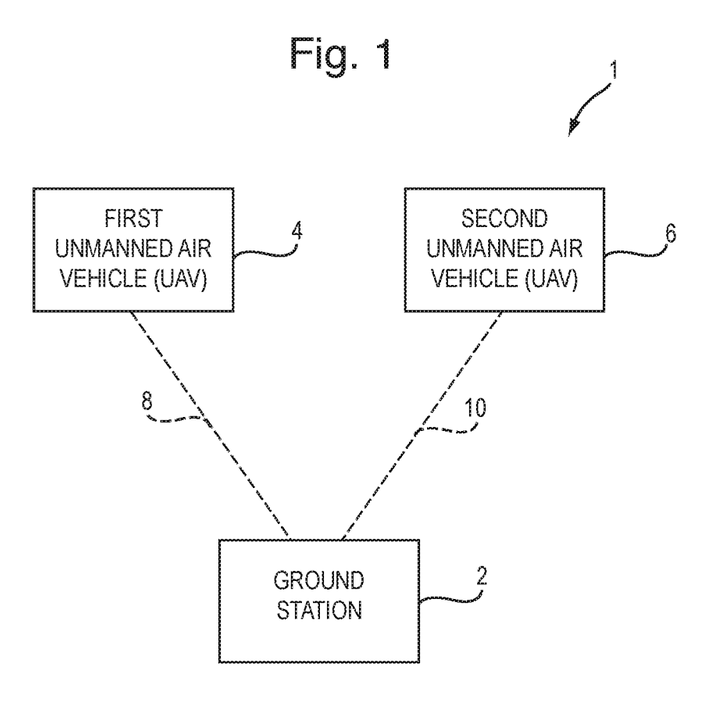
FIG. 1 is a schematic illustration (not to scale) of an example system.

FIG. 1 is a schematic illustration (not to scale) of an example system 1 that is to implement an embodiment of a process of accomplishing an operator specified goal.

In this embodiment, the system 1 comprises a ground station 2, a first unmanned air vehicle (UAV) 4, and a second UAV 6.

The ground station 2 is described in more detail later below with reference to FIG. 2. The ground station is a building located on the ground.

In this embodiment, the first and second UAVs 4, 6 are configured to fly in the airspace proximate to the ground station 2. As described in more detail later below, the first and second UAVs 4, 6 are controlled or operated from the ground station 2.

The first UAV 4 is connected to the ground station by a first wireless radio frequency (RF) communication link 8. The first communication link 8 is such that information, for example control commands, may be sent between the ground station 2 and the first UAV 4.

In this embodiment, in order for the first communication link 8 to be a high quality and high bandwidth communication link, there is a constraint that there is a "line-of-sight" between the ground station 2 and the first UAV 4. The terminology "line-of-sight" is used herein to refer to an unobstructed straight line between two entities along which an observer at one of those entities may view the other of those entities. In this embodiment, if a line of sight between the ground station 2 and the first UAV 4 does not exist, communication between the ground station 2 and the first UAV 4 may not be possible or may be of poor quality (for example, unreliable, noisy, etc.).

The second UAV 6 is connected to the ground station by a second wireless RF communication link 10. The second communication link 10 is such that information, for example control commands, may be sent between the ground station 2 and the second UAV 6.

In this embodiment, in order for the second communication link 10 to be a high quality and high bandwidth communication link, there is a constraint that there is a "line-of-sight" between the ground station 2 and the first UAV 4. In this embodiment, if a line of sight between the ground station 2 and the second UAV 6 does not exist, communication between the ground station 2 and the second UAV 6 may not be possible or may be of poor quality.

Figure 2:
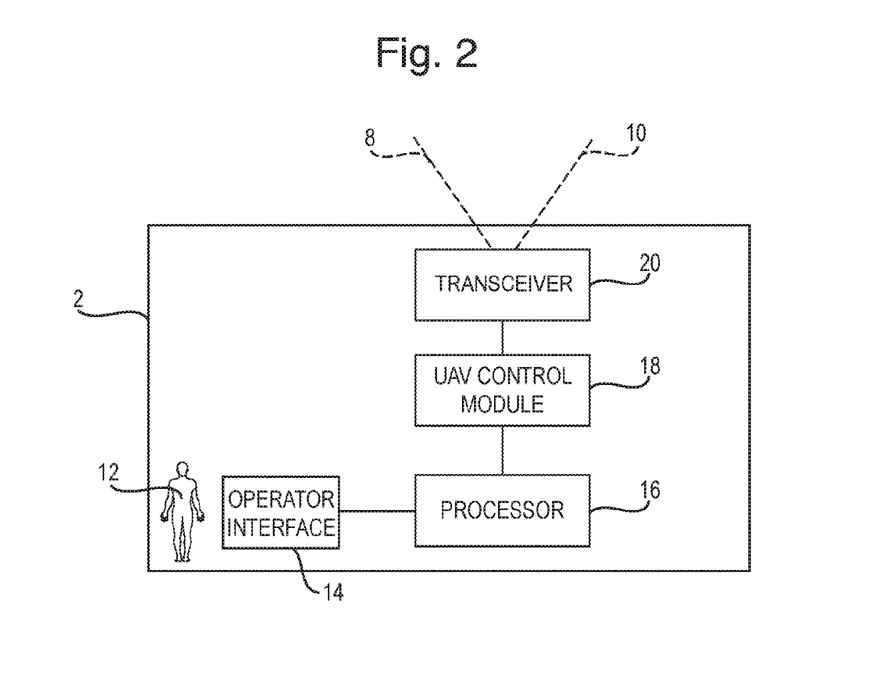
FIG. 2 is a schematic illustration (not to scale) of a ground station.

FIG. 2 is a schematic illustration (not to scale) of the ground station 2.

In this embodiment, the ground station 2 comprises an operator 12, an operator interface 14, a processor 16, UAV control module 18, and a transceiver 20.

In this embodiment, the operator 12 is a human operator. The operator may input information into the operator interface 14.

The operator interface 14 may be any appropriate operator interface. For example, the operator interface may include a display (such as a monitor display, or a touchscreen display), a keyboard, a mouse controller, etc. In this embodiment, the operator interface 14 is connected to the processor 16 such that information (such as a signal corresponding to information input into the operator interface 14 by the operator 12) may be sent between the operator interface 14 and the processor 16.

The processor 16 is described in more detail later below with reference to FIG. 3. The processor 16 is configured to process information received by it. In addition to being connected to the operator interface 14, the processor 16 is connected to the UAV control module 18 such that information (such as an output of the processor 16) may be sent between the processor 16 and the UAV control module 18.

As described in more detail later below with reference to FIG. 4, in this embodiment the UAV control module 18 is configured to process information received by it so as to determine control signals for controlling the first and second UAVs 4, 6. In addition to being connected to the processor 16, the UAV control module 18 is connected to the transceiver 20 such that information (such as a control signal for controlling a UAV 4, 6) may be sent between the UAV control module 18 and the transceiver 20.

In this embodiment, the transceiver 12 is capable of transmitting information to the first UAV 4 via the first communication link 8. Also, the transceiver 12 is capable of receiving information from the first UAV 4 via the first communication link 8. Also, the transceiver 12 is capable of transmitting information to the second UAV 6 via the second communication link 10. Also, the transceiver 12 is capable of receiving information from the second UAV 6 via the second communication link 10.

Figure 3:
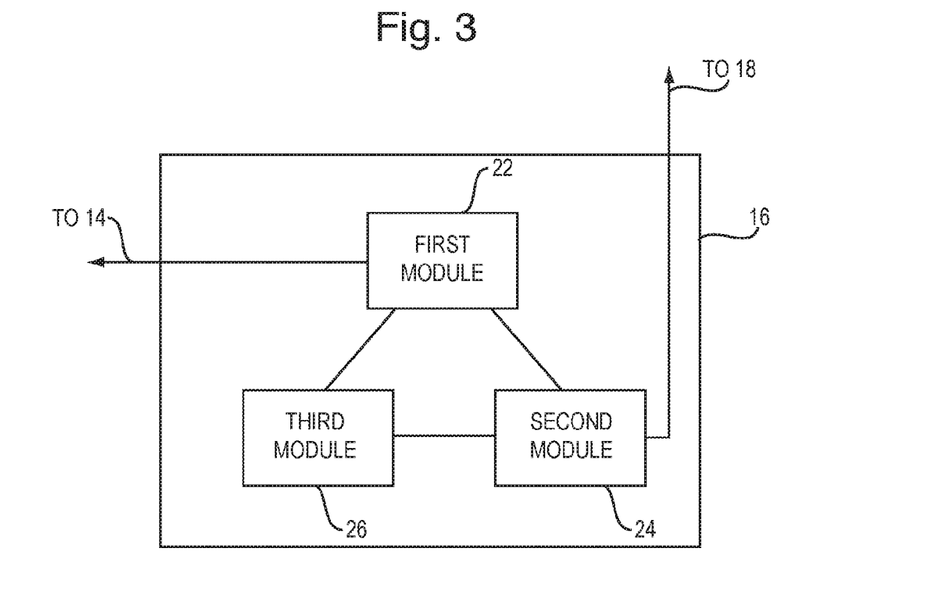
FIG. 3 is a schematic illustration (not to scale) of a processor.

FIG. 3 is a schematic illustration (not to scale) of the processor 16.

In this embodiment, the processor 16 comprises a first module 22, a second module 24, and a third module 26.

The functionality of the first module 22 is described in more detail later below with reference to FIG. 4. In this embodiment, the first module 22 is a mission planning module configured to perform a mission planning, or task planning, process. For example, the first module 22 may be a Tactical Goal Based Mission Planner. Further information on mission planning modules, mission or task planning processes, and the Tactical Goal Based Mission Planner may be found, for example, in PCT/GB2012/052049 *"Goal Based Planning System"*, GB patent application GB1114815.2, and *"Toward a Goal-based Mission Planning Capability—Using PDDL based Automated Planners"* John Bookless, Glenn Callow: ICAART (1) 2012: 481-484, each of which is incorporated herein, in its entirety, by reference.

The first module 22 is connected to the user interface 14 such that information may be sent between the first module 22 and the user interface 14. Also, the first module 22 is connected to the second module 24 and the third module 26 such that information may be sent between the first module 22 and each of the second and third modules 24, 26.

The functionality of the second module 24 is described in more detail later below with reference to FIG. 4. In this embodiment, the second module 24 is a communication planning module configured to perform a communication planning process. For example, the second module 24 may be a Predict Ahead Communication Planner. Further information on communication planning processes, and the Predict Ahead Communication Planner may be found, for example, in GB patent application GB1114329.4 *"Adaptive communications network for mobile client platforms"*, which is incorporated herein, in its entirety, by reference. In this embodiment, as described in more detail later below with reference to FIG. 4, the communication planning process may result in one or more problems being identified or detected by the second module 24. Thus, in this embodiment, the communication planning process is a problem detection, or identification, process.

The second module 24 is connected to the UAV control module 18 such that information may be sent between the second module 24 and the UAV control module 18. Also, in addition to being connected to the first module 22, and the UAV control module 18, the second module 24 is connected to the third module 26 such that information may be sent between the second module 24 and the third module 26.

In this embodiment, the third module 26 is configured to perform a problem resolution process. In particular, as described in more detail later below with reference to FIG. 4, the third module 26 is configured to determine a solution to a problem identified or detected by the second module 24. A solution to a problem determined by the third module 26, may be in the form of a number of recommendations, or remedial actions, that, if implemented, would solve that problem.

Apparatus, including the processor 16, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 4:
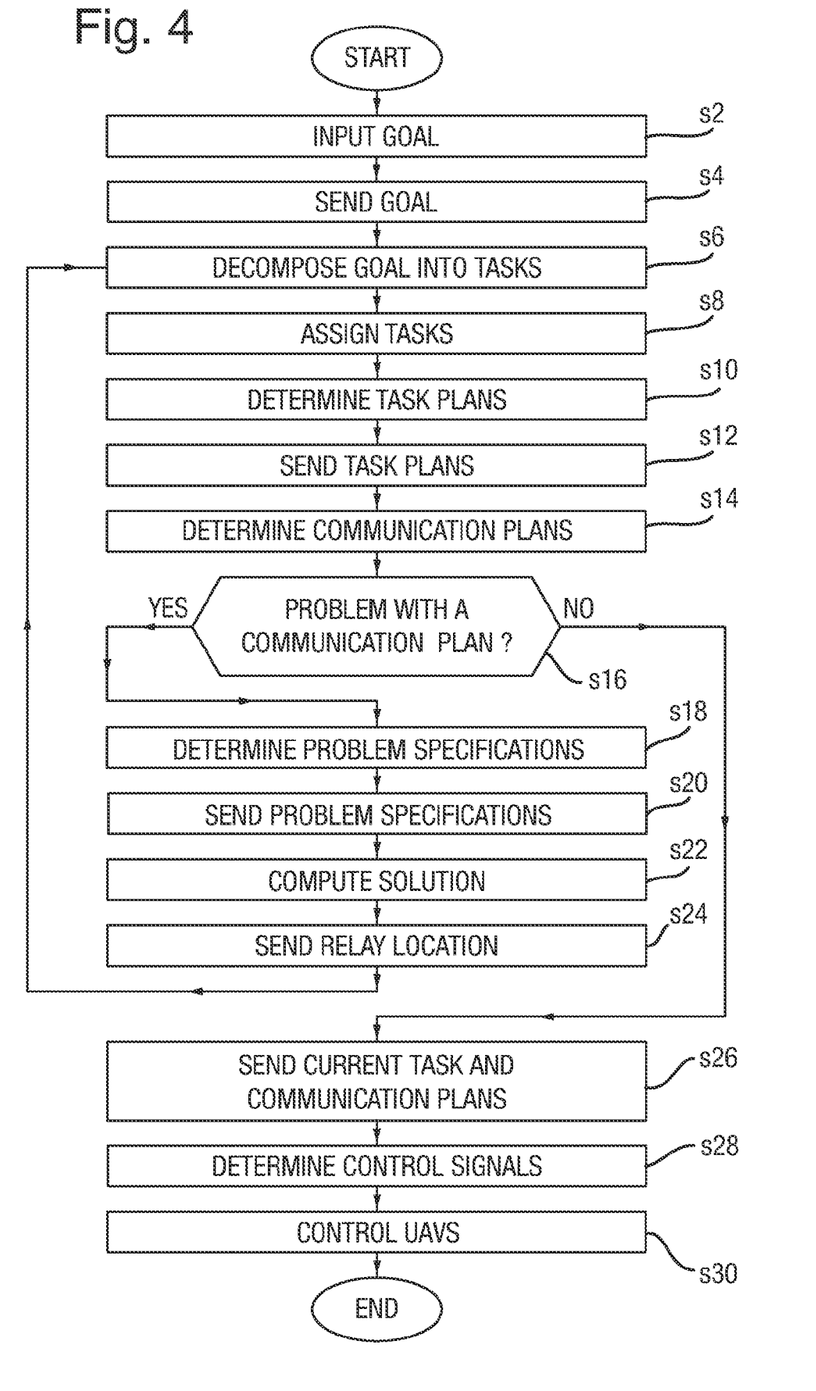
FIG. 4 is a process flow chart showing certain steps of an embodiment of a process of accomplishing an operator specified goal.

FIG. 4 is a process flow chart showing certain steps of an embodiment in which the entities of the system 1 are implemented so as to accomplish a goal.

At step s2, the operator 12 inputs a goal specification into the user interface 14.

The goal specification specifies a goal (i.e. a task, a mission, or an objective) that the operator 12 desires to be completed by the team of UAVs 4, 6.

In this embodiment, the operator 12 tasks the first and second UAVs 4, 6 to search two separate areas of terrain for certain objects (e.g. vehicles). The two areas of terrain are hereinafter referred to as the "first area" and the "second area". Thus, the goal specification includes locations of the first and second areas, an instruction to search those areas, and information specifying the objects that are to be searched for.

At step s4, the user interface 14 sends the goal specification to the first module 22.

Steps s6 to s10 describe a task planning process performed by the first module 22 on the received goal specification. This task planning process is performed to determine, for each of the UAVs 4, 6, a plan for a task that is to be performed by that UAV 4, 6, thereby accomplishing the goal specified by the operator 12.

In this embodiment, any communication constraints placed on the UAVs 4, 6 are ignored during the task planning process of step s6 to s10.

At step s6, the first module 22 performs a goal decomposition process on the goal specification. This process is performed to decompose the goal into a set of tasks that are to be performed by the UAVs 4, 6.

In this embodiment, the goal is decomposed into two different tasks. A first task is a task to search the first area for the certain objects. A second task is to search the second area for the certain objects.

At step s8, the first module 22 computes a set of task assignments for the UAVs 4, 6. In other words, the first module 22 assigns, to one or the UAVs 4, 6, each of the tasks into which the goal has been decomposed.

This assignment can, for example, be configured to minimise the mission duration and/or to maximise the UAV utilisation. Example task assignment algorithms include, but are not limited to, Max Sum Assignment, Brute Force Assignment, Simulated Annealing, Consensus Based Bundle Approach (CBBA), Greedy Allocation, and Mixed Integer Linear Programming (MILP).

In this embodiment, the first task is assigned to the first UAV 4 and the second task is assigned to the second UAV 6.

At step s10, for each of the UAVs 4, 6, the first module 22 determines a detailed task plan such that, by implementing its task plan, that UAV 4, 6 completes the task that has been assigned to it.

Plans for the UAVs 4, 6 may be computed, for example, using a PDDL (Planning Domain Definition Language). Further information on PDDL may be found in M. Ghallab, "*PDDL—The Planning Domain Definition Language*", Technical Report CVC TR-98-003/DCS TR-1165, Yale Center for Computational Vision and Control, New Haven, Conn., 1998 which is incorporated herein by reference.

In this embodiment, a first task plan is determined for the first UAV 4, and a second task plan is determined for the second UAV 6. The first and second task plans are illustrated schematically in FIG. 5.

Figure 5:
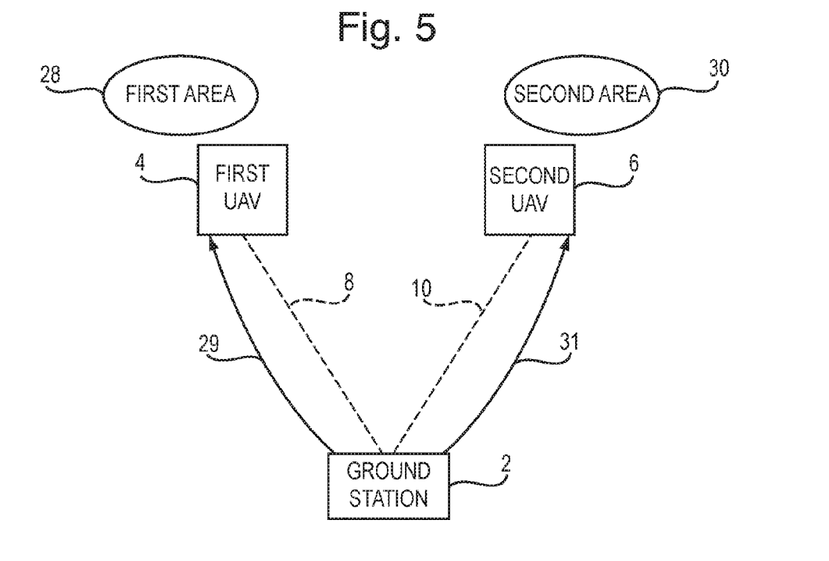
FIG. 5 is a schematic illustration (not to scale) illustrating a first task plan and a second task plan.

As shown in FIG. 5, the first task plan includes the first UAV 4 flying from the ground station 2 to the first area 28. The path travelled by the first UAV 4 from the ground station 2 to the first area 28 is hereinafter referred to as the "first path" and is indicated in FIG. 5 by a solid arrow and the reference numeral 29. The first path 29 may comprise a plurality of waypoints. The first task plan further includes the first UAV 4 performing a search operation to search the first area 28 for the certain objects.

Also, as shown in FIG. 5, the second task plan includes the second UAV 6 flying from the ground station 2 to the second area 30. The path travelled by the second UAV 6 from the ground station 2 to the second area 30 is hereinafter referred to as the "second path" and is indicated in FIG. 5 by a solid arrow and the reference numeral 31. The second path 31 may comprise a plurality of waypoints. The second task plan further includes the second UAV 6 performing a search operation to search the second area 30 for the certain objects.

The task plans determined at step s10 describe the nominal whereabouts of the UAVs 4, 6 during the tasks, as well as the task-dependent communication requirements of the UAVs 4, 6 during the tasks.

At step s12, the first module 22 sends the determined task plans to the second module 24.

Steps s14 to s18 describe a communication plan determination process performed by the second module 24. In this embodiment, any communication constraints placed on the UAVs 4, 6 are taken into account during the communication plan determination process of step s14 to s18.

At step s14, for each of the UAVs 4, 6, the second module 24 determines a communication plan that is to be followed whilst the UAV 4, 6 performs its task plan.

In this embodiment, a first communication plan is determined for the first UAV 4. Also, a second communication plan is determined for the second UAV 6.

In this embodiment, the first communication plan includes the first UAV 4 communicating, via the first communication link 8, with the ground station 2 at each waypoint along the first path 29. The first communication plan may further specify what communication channels to use etc.

Similarly, in this embodiment, the second communication plan includes the second UAV 6 communicating, via the second communication link 10, with the ground station 2 at each waypoint along the second path 31. The second communication plan may further specify what communication channels to use etc.

At step s16, the second module determines whether or not there is a problem with one or more of the communication plans.

In this embodiment, a problem with a communication plan exists if it is not possible to implement that communication plan (e.g. due to the communication constraints placed on one or more of the UAVs 4, 6). For example, a communication plan specifying that two entities are to communicate may not be implementable if, at a step in that communication plan, a communication link between those two entities cannot be established (or is not sufficiently robust).

If at step s16, a problem with one or more of the communication plans is detected, the process of FIG. 4 proceeds to step s18. However, if at step s16, no problems are detected, the process of FIG. 4 proceeds to step s26.

In this embodiment, the second module 24 detects a problem with the first and second communication plans. In particular, in this embodiment, the second module 24 determines that, when the first UAV 4 is located at the first area 28, communication between the first UAV 4 and the ground station 2 is not possible, or not sufficiently robust. Also, in this embodiment, the second module 24 determines that, when the second UAV 6 is located at the second area 30, communication between the second UAV 6 and the ground station 2 is not possible, or not sufficiently robust.

At step s18, the second module 26 determines a problem specification for each of the detected problems.

In this embodiment, each problem specification identifies an affected entity (for example, either the first UAV 4 or the second UAV 6), a time window within which a communication problem occurs (i.e., a time period in the relevant task plan or communication plan at which a problem occurs), and the waypoints along the path of the affected entity, at which the affected entity would be located during the identified time window.

In particular, in this embodiment, the second module 24 identifies each step in the first communication plan where it is not possible to establish a communications link that is sufficient to perform that step. In particular, in this embodiment, the second module 24 identifies each waypoint along the first path 29 at which communication between the first UAV 4 and the ground station 2, via the first communication link 8, is not possible.

For example, in some embodiments, at some of the way points along the first path 29, terrain features (such as hills, buildings, etc.) may block a line-of-sight between the first UAV 4 and the ground station 2. Also, in some embodiments, a line-of-sight between the first UAV 4 and the ground station 2 may be blocked due to the curvature of the Earth. At such way points, high quality and high bandwidth communication between the ground station 2 and the first UAV 4 may not be possible. Determining at which waypoints along the first path 29 a line-of-sight between the first UAV 4 and the ground station 2 is blocked may, for example, be performed using an elevation map of the terrain over which the first UAV 4 would fly were the first task plan to be implemented by the first UAV 4.

Also for example, in some embodiments, at some of the way points along the first path 29, the first UAV 4 may be out of communications range with the ground station 2, i.e. communication between the first UAV 4 and the ground station 2 may not be possible due to the distance between the first UAV 4 and the ground station 2. Determining at which waypoints along the first path 29 the first UAV 4 is out of communications range with the ground station 2 may, for example, be performed using information specifying the communications capabilities of the first UAV 4 and the ground station 2, and the first task plan.

Similarly, in this embodiment, the second module 24 identifies each step in the second communication plan where it is not possible to establish a communications link that is sufficient to perform that step. In particular, in this embodiment, the second module 24 identifies each waypoint along the second path 31 at which communication between the second UAV 6 and the ground station 2, via the second communication link 10, is not possible. For example, the second module 24 may (e.g., using a terrain elevation map) identify each way points along the second path 31 at which a line-of-sight between the second UAV 6 and the ground station 2 is blocked (e.g. by terrain features or due to the curvature of the Earth). Also for example, the second module 24 may identify each way points along the second path 31 at which the first UAV 4 may be out of communications range with the ground station 2.

At step s20, the second module 24 sends specifications of each of the problems identified by the second module 24 at step s18 to the third module 26.

In this embodiment, the problem specifications are sent as an ordered list of problem specifications. In this embodiment, the first problem specification in the ordered list specifies the identified communication problems within the first communication plan.

In other words, the first problem specification in the ordered list specifies the first UAV 4 as the affected entity, the waypoints along the first path 29 at which communication between the first UAV 4 and the ground station 2 is not possible, and a time window at which the first UAV 2 would be located at the identified waypoints. Also, in this embodiment, the second problem specification in the ordered list specifies the identified communication problems within the second communication plan.

At step s22, the third module 26 computes a solution to the problem specified by the first problem specification in the ordered list received by the third module 26.

In other words, in this embodiment, the third module 26 computes a solution to the identified communication problems within the first communication plan.

In this embodiment, computing a solution to a communication problem comprises computing an optimal location for a communication relay such that, by communicating via the communication relay, the communication problem is eliminated. A communication relay is an entity that relays messages between different points. For example, a communication relay may receive a communication or message from one entity, and relay (or transmit) that communication or message to a different entity.

In this embodiment, the third module computes a location for a communication relay between the first UAV 4 and the ground station 2 such that, at all points along the first path 29, communication between the first UAV 4 and the ground station 2 (via the communication relay) is possible At step s24, the third module 26 sends the location for the communication relay to the first module 22.

Thus, a modified goal is provided to the first module 22. In this embodiment, the modified goal includes a requirement that the first area 28 and the second area 30 to be searched for the certain objects, and also a requirement that a communication relay is located at the determined location at certain stages.

In this embodiment, the solution to a problem computed at step s22 results in a modified goal being provided to the first module 22 to process. In some embodiments, the solution to a problem includes a remedial action, a modified goal, an additional task and/or additional task constraints being provided the first module 22 to process.

After step s24, the process of FIG. 4 proceeds back to step s6 for a second iteration of the process steps s6 to s24.

In this embodiment, at the second iteration of step s6, the goal decomposition process performed by the first module 22 produces a new task (hereinafter referred to as the third task), in addition to the first and second tasks. In this embodiment, the third task is to provide a communication relay at the location determined at the first iteration of step s22.

Thus, in this embodiment, the goal is decomposed into three different tasks. The first task is a task to search the first area 28 for the certain objects. The second task is to search the second area 30 for the certain objects. And the third task is to provide a communication relay at the location determined at the first iteration of step s22.

At the second iteration of step s8, the first module 22 computes a set of task assignments for the UAVs 4, 6 so as to assign, to the UAVs 4, 6, the three tasks into which the goal has been decomposed.

In this embodiment, the first task and the second task are assigned to the first UAV 4, and the third task is assigned to the second UAV 6.

At the second iteration of step s10, for each of the UAVs 4, 6, the first module 22 determines a task plan, such that that UAV 4, 6 may complete the one or more tasks that have been assigned to it.

In this embodiment, a task plan is determined for the first UAV 4. This task plan is hereinafter referred to as the "third task plan". Also, a task plan is determined for the second UAV 6. This task plan is hereinafter referred to as the "fourth task plan". The third and fourth task plans are illustrated schematically in FIG. 6.

Figure 6:
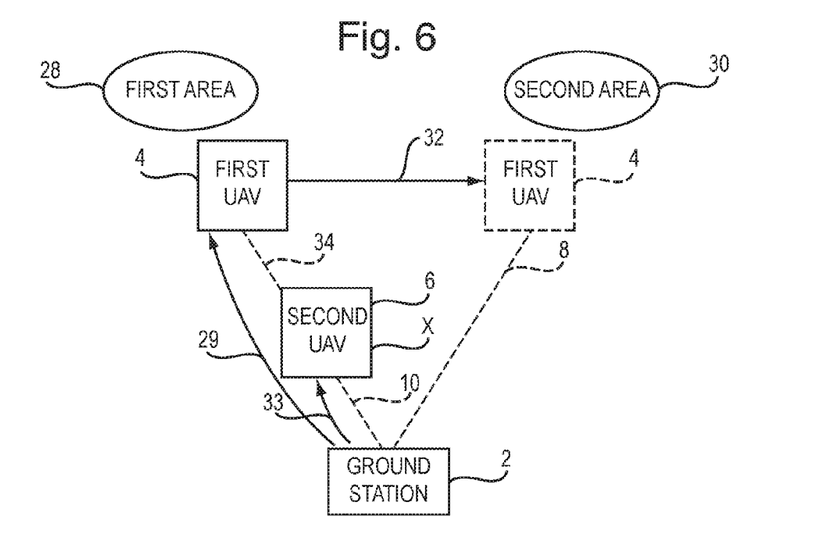
FIG. 6 is a schematic illustration (not to scale) illustrating a third task plan and a fourth task plan.

As shown in FIG. 6, the third task plan includes the first UAV 4 flying from the ground station 2, to the first area 28, along the first path 29. The third task plan further includes the first UAV 4 performing a search operation to search the first area 28 for the certain objects. The third plan further includes the first UAV 4 flying from the first area 28 to the second area 30. The path travelled by the first UAV 4 between the first area 28 and the second area 30 is hereinafter referred to as the "third path" and is indicated in FIG. 6 by a solid arrow and the reference numeral 32. The third task plan further includes the first UAV 4 performing a search operation to search the second area 30 for the certain objects.

Also, as shown in FIG. 6, the fourth task plan includes the second UAV 6 flying from the ground station 2 to the location for the communication relay that has been determined at the first iteration of step s20. This location for the communication relay is indicated in FIG. 6 by an 'X'. The path travelled by the second UAV 6 from the ground station 2 to the location X is hereinafter referred to as the "fourth path" and is indicated in FIG. 6 by a solid arrow and the reference numeral 33. The fourth path 33 may comprise a plurality of waypoints. The fourth task plan further includes the second UAV 6 acting as a communication relay, at location X, between the ground station 2 and the first UAV 4 whilst the first UAV 4 is located at the first area 28.

At the second iteration of step s12, the first module 22 sends the determined task plans to the second module 24.

At the second iteration of step s14, for each of the UAVs 4, 6, the second module 24 determines a communication plan that is to be followed whilst that UAV 4, 6 performs its assigned task plan.

In this embodiment, a communication plan is determined for the first UAV 4. This communication plan is hereinafter referred to as the "third communication plan". Also, a communication plan is determined for the second UAV 6. This communication plan is hereinafter referred to as the "fourth communication plan".

In this embodiment, the third communication plan includes the first UAV 4 communicating with the ground station 2 at each waypoint along the first path 29. In this embodiment, at some stages of the third communication plan, communication between the first UAV 4 and the ground station 2 is provided by using the second UAV 6 as a communication relay. In other words, at some stages of the third communication plan, communication between the first UAV 4 and the ground station is provided by a communication link between the UAVs 4, 6 (which is hereinafter referred to as the "third communication link" and is indicated in FIG. 6 by the reference numeral 34), and the second communication link 10. The third communication plan further includes the first UAV 4 communicating with the ground station 2, via the first communication link 8, whilst the first UAV 4 is located at the second area 30.

In this embodiment, the fourth communication plan includes the second UAV 6 acting as a communication relay between the first UAV 4 and the ground station.

At the second iteration of step s16, the second module 24 determines whether or not there is a problem with one or more of the communication plans.

In this embodiment, the second module 24 detects a problem with the third communication plan. In particular, in this embodiment, the second module 24 determines that, when the first UAV 4 is located at the second area 30, communication between the first UAV 4 and the ground station is not possible, or not sufficiently robust.

At the second iteration of step s18, the second module 26 determines a problem specification for each of the detected problems.

In this embodiment, the second module 24 identifies each step in the third communication plan where it is not possible to establish a communications link that is sufficient to perform that step. In particular, in this embodiment, the second module 24 identifies each waypoint along the third path 33 at which communication between the first UAV 4 and the ground station 2 is not possible. In particular, the second module 24 identifies that, when the first UAV 4 is at the second area 30 communication between the first UAV 4 and the ground station 2 is not possible.

At the second iteration of step s20, the second module 24 sends, as an ordered list, problem specifications for each of the problems identified by the second module 24 at the second iteration of step s18 to the third module 26.

In this embodiment, the problem specifications are sent. In this embodiment, the first problem specification in the ordered list specifies the identified communication problems within the first communication plan.

In other words, the first problem specification in the ordered list specifies the first UAV 4 as the affected entity, the waypoints along the first path 29 at which communication between the first UAV 4 and the ground station 2 is not possible, and a time window at which the first UAV 2 would be located at the identified waypoints. Also, in this embodiment, the second problem specification in the ordered list specifies the identified communication problems within the second communication plan.

At the second iteration of step s22, the third module 26 computes a solution to the problem specified by the first problem specification in the ordered list received by the third module 26.

In other words, in this embodiment, the third module 26 computes a solution to the identified communication problems within the third communication plan.

In this embodiment, the third module 26 computes a location for a further communication relay between the first UAV 4 and the ground station 2 such that, when the first UAV 4 is located at the second area 30, communication between the first UAV 4 and the ground station 2 (via the further communication relay) is possible At the second iteration of step s24, the third module 26 sends the location for the further communication relay to the first module 22.

Thus, a further modified goal is provided to the first module 22. In this embodiment, the further modified goal includes a requirement that the first area 28 and the second area 30 be searched for the certain objects, that a communication relay is located at location X at certain stages, and that a communication relay is located at the determined location at certain stages.

After the second iteration of step s24, the process of FIG. 4 proceeds back to step s6 for a third iteration of the process steps s6 to s24.

In this embodiment, at the third iteration of step s6, the goal decomposition process performed by the first module 22 produces a new task (hereinafter referred to as the fourth task), in addition to the first, second, and third tasks. In this embodiment, the fourth task is to provide a further communication relay at the location determined at the second iteration of step s22.

Thus, in this embodiment, the goal is decomposed into four different tasks. The first task is a task to search the first area 28 for the certain objects. The second task is to search the second area 30 for the certain objects. The third task is to provide a communication relay at the location determined at the first iteration of step s22. The fourth task is to provide a communication relay at the location determined at the second iteration of step s22.

At the third iteration of step s8, the first module 22 computes a set of task assignments for the UAVs 4, 6 so as to assign, to the UAVs 4, 6, the four tasks into which the goal has been decomposed.

In this embodiment, the first task and the second task are assigned to the first UAV 4. Also, the third and fourth tasks are assigned to the second UAV 6.

At the third iteration of step s10, for each of the UAVs 4, 6, the first module 22 determines a task plan, such that that UAV 4, 6 may complete the one or more tasks that have been assigned to it.

In this embodiment, a task plan is determined for the first UAV 4. This task plan is hereinafter referred to as the "fifth task plan". Also, a task plan is determined for the second UAV 6. This task plan is hereinafter referred to as the "sixth task plan". The fifth and sixth task plans are illustrated schematically in FIG. 7.

Figure 7:
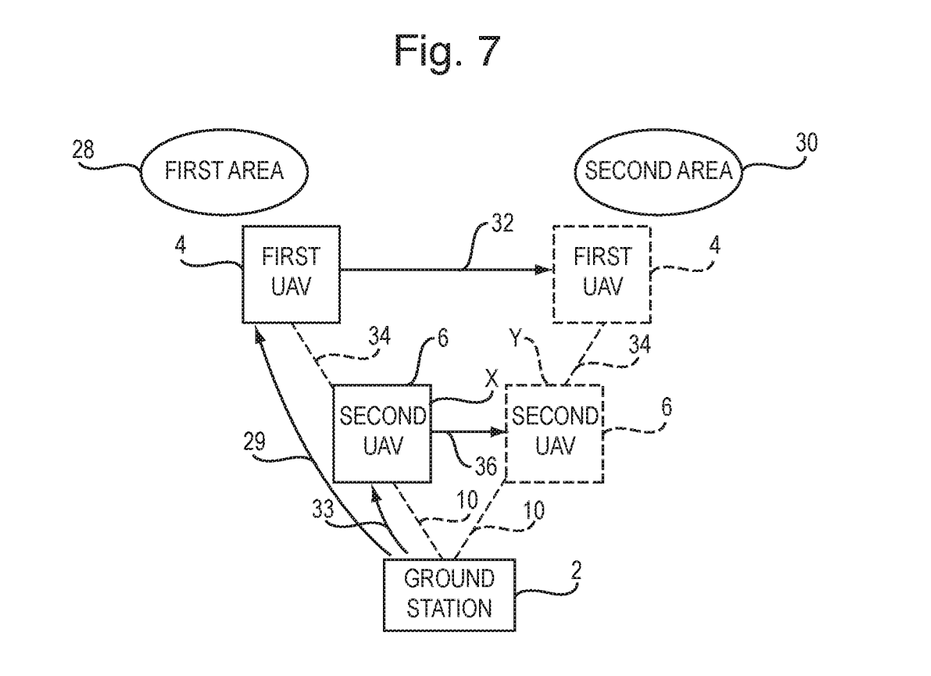
FIG. 7 is a schematic illustration (not to scale) illustrating a fifth task plan and a sixth task plan.

As shown in FIG. 7, the fifth task plan includes the first UAV 4 flying from the ground station 2, to the first area 28, along the first path 29. The fifth task plan further includes the first UAV 4 performing a search operation to search the first area 28 for the certain objects. The fifth plan further includes the first UAV 4 flying from the first area 28 to the second area 30 along the third path 32. The fifth task plan further includes the first UAV 4 performing a search operation to search the second area 30 for the certain objects.

Also, as shown in FIG. 7, the sixth task plan includes the second UAV 6 flying from the ground station 2 to the location X (i.e. the location for the communication relay that has been determined at the first iteration of step s20) along the fourth path 33. The fourth task plan further includes the second UAV 6 acting as a communication relay, at location X, between the ground station 2 and the first UAV 4 whilst the first UAV 4 is located at the first area 28. The sixth task plan further includes the second UAV 6 flying from the location X to the location for the further communication relay that has been determined at the second iteration of step s20. This location for the further communication relay is indicated in FIG. 7 by a 'Y'. The path travelled by the second UAV 6 from the location X to the location Y is hereinafter referred to as the "fifth path" and is indicated in FIG. 7 by a solid arrow and the reference numeral 36. The fifth path 36 may comprise a plurality of waypoints. The sixth task plan further includes the second UAV 6 acting as a communication relay, at location Y, between the ground station 2 and the first UAV 4 whilst the first UAV 4 is located at the second area 30.

At the third iteration of step s12, the first module 22 sends the determined task plans to the second module 24.

At the third iteration of step s14, for each of the UAVs 4, 6, the second module 24 determines a communication plan that is to be followed whilst that UAV 4, 6 performs its assigned task plan.

In this embodiment, a communication plan is determined for the first UAV 4. This communication plan is hereinafter referred to as the "fifth communication plan". Also, a communication plan is determined for the second UAV 6. This communication plan is hereinafter referred to as the "sixth communication plan".

In this embodiment, the fifth communication plan includes the first UAV 4 communicating with the ground station 2 at each waypoint along the first path 29. In this embodiment, at some waypoints along the first path 29, communication between the first UAV 4 and the ground station 2 is provided by using the second UAV 6 as a communication relay at location X (i.e. via the third communication link 34 and the second communication link 10). The fifth communication plan further includes the first UAV 4 communicating with the ground station 2 whilst the first UAV 4 is located at the second area 30. In this embodiment, whilst the first UAV 4 is located at the second area 30, communication between the first UAV 4 and the ground station 2 is provided by using the second UAV 6 as a communication relay at location Y (i.e. via the third communication link 34 and the second communication link 10).

In this embodiment, the sixth communication plan includes the second UAV 6 acting as the communication relay, at location X, between the first UAV 4 and the ground station 2. Also, the sixth communication plan includes the second UAV 6 acting as the further communication relay, at location Y, between the first UAV 4 and the ground station 2.

At the third iteration of step s16, the second module 24 determines whether or not there is a problem with one or more of the communication plans.

In this embodiment, the second module 24 determines that there are no problems with the current communication plans (i.e. the fifth and sixth communication plans).

Thus, in this embodiment, as no problems are detected at the third iteration of step s16, the process of FIG. 4 proceeds to step s26.

At step s26, the second module 24 sends the current task and communication plans to the UAV controller 18.

Thus, in this embodiment, the fifth and sixth task plans, and the fifth and sixth communication plans, are sent from the second module 24 to the UAV controller 18.

At step s28, using the received task and communication plans, the UAV controller 18 determines a control signal for each of the UAVs 4, 6.

In this embodiment, the control signals determined for the UAVs are for controlling the UAVs 4, 6 such that the UAVs 4, 6 performs the current task plans and communications plans. In other words, the control signals determined by the UAV controller 18 at step s28 include a control signal for controlling the first UAV 4 such that the first UAV 4 performs the fifth task plan and the fifth communication plan. Also, the control signals determined by the UAV controller 18 at step s28 include a control signal for controlling the second UAV 6 such that the second UAV 6 performs the sixth task plan and the sixth communication plan.

At step s30, using the determined control signals, the UAV controller 18 controls the UAVs 4, 6 such that the current task and communication plans are performed by the UAVs 4, 6.

In this embodiment, the controlling of the UAVs 4, 6 comprises, the UAV controller 18 sending, to the first UAV 4, the control signal determined for the first UAV 4. The first UAV 4 receives the control signal and performs fifth task plan and the fifth communication plan. Similarly, the UAV controller 18 sends, to the second UAV 6, the control signal determined for the second UAV 6. The second UAV 6 receives the control signal and performs sixth task plan and the sixth communication plan.

In this embodiment, a control signal is sent from the UAV controller 18 to a UAV 4, 6 via the transceiver 20.

Thus, the goal specified by the operator 12 at step s2 is accomplished by the team of UAVs 4, 6. In particular, the first and second UAVs 4, 6 search the first area 28 and the second area 30 for the certain objects. Moreover, effective communications links between the UAVs 4, 6 and the ground station 2 are maintained during the performance of the tasks.

Thus, an example process in which the entities of the system 1 are implemented so as to accomplish a goal is provided.

In the above embodiments, the mission/task planner (i.e. the first module) computes task plans for the UAVs while ignoring any communication constraints placed on the UAVs. The resulting mission plan is then forwarded to the problem detector (i.e. the second module), which in turn identifies steps in the mission plan at which the communication constraints are not satisfied. The resulting list of problems is forwarded to the remedial action planner (i.e. the third module), which computes an additional action that will prevent one of the problems from occurring. The additional action is then incorporated into the mission plan by the mission/task planner. This cycle is repeated, until a problem free mission, or set of tasks, is found.

Advantageously, the above described system and method tend to allow for the solving of mission planning problems that have complex and nonlinear constraints, such as communication constraints.

In the above described method, the mission planning problem is separated into different steps (namely, a task plan determination step, a communication plan determination step, a problem detection step, and a solution determination step). These steps are executed iteratively until a valid solution (i.e. a valid mission plan) is found. This is in contrast to conventional mission planning methodologies. Conventional methodologies may, for example, formulate the mission planning problem as a single optimisation problem with complex and nonlinear constraints.

Some conventional mission planning methodologies approximate nonlinear constraints as simpler linear constraints. The above described method advantageously tends to eliminate this approximation. Thus, the above described method tends to produce more accurate solutions than those produced using conventional processes.

Some conventional methodologies reduce the size of the planning problem, i.e. simplify the planning problem. The above described method advantageously tends to eliminate this simplification. Thus, the above described method tends to produce more accurate solutions than those produced using conventional processes.

The above described system and method integrates specialist mission/task planning, and communication planning, modules/tools. Advantageously, this integration allows for the solving of complex planning problems. The complex planning problems are solved by iterative use of the integrated modules.

The above described system and method advantageously tends to provide for higher fidelity implementation of complex and nonlinear constraints compared to the prior art.

In conventional methodologies, communication constraints (e.g. radio communication constraints) are typically modelled as simple distance constraints and/or as simple obstacles that block communication. However, using the above described system and method, radio communication constraints may be modelled using a radio wave propagation model. Such a model may, for example, model the effects of terrain and foliage on radio wave propagation with a high degree of accuracy. Thus, using the above described system and method, obstacles that fully or partially block RF communications, and other radio wave propagation effects, may be taken into account. Use of such radio wave propagation models tends to provide solutions having greater accuracy and robustness compared to solutions determined using conventional techniques. This modelling of communication constraints tends not to be possible using conventional methodologies.

Advantageously, the missions determined using the above described system and method tend to be robust to communications failure.

It should be noted that certain of the process steps depicted in the flowchart of FIG. 4 and described above may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the goal to be accomplished is specified by a human operator. Also, the goal is to search two separate areas of terrain, using UAVs, for certain objects. However, in other embodiments, the goal may be specified by a different type of entity. For example, in some embodiments, a goal may be determined and specified by a processor. In other embodiments, the goal is a different goal. For example, in other embodiments, the goal is for a UAV, or different vehicle, to deliver a payload to a specified destination.

In the above embodiments, the process of accomplishing a goal is implemented using the system described in more detail earlier above with reference to FIG. 1. In particular, in the above embodiments, the system comprises two UAVs, a single immobile ground station. Also, the UAVs and the ground station communicate with one another via wireless RF communications links. However, in other embodiments, the process of accomplishing a goal is implemented using a different type system. For example, in other embodiments, the system comprises a different number of UAVs e.g. a single UAV or more than two UAVs. Also, in other embodiments, one or more of the UAVs is a different type of entity, for example, a different type of vehicle e.g. a manned aircraft, a land-based vehicle, a water-based vehicle, etc. Also, in other embodiments, the system comprises a different number of ground stations. Also, in other embodiments, one or more of the ground stations is a different type of entity, for example, a mobile entity, for example a vehicle. Also, in other embodiments, one or more of the communications links is a different type of communication link, for example, a wired communication link, or an acoustic communication link (e.g. an underwater acoustic communication link).

In the above embodiments, the remedial actions, i.e. the solution to the identified communication problems, determined by the third module include providing a communication relay at a certain location. However, in other embodiments, a remedial action may include performing a different type of action.

In the above embodiments, at each iteration of step s22, the third module determines a solution for only a single communication problem. Thus, the set of communications problems a solved sequentially, i.e. a single communication problem is solved at each iteration, and the method is iterated until there are no communication problems left. An attempt to solve a plurality of communication problems during the same iteration may result in an intractable mission planning problem. Thus, the likelihood of the mission planning problem becoming intractable tends to be reduced or eliminated. In other embodiments, this feature may be provided in a different way. For example, at step s22 solutions to all communication problems may be determined, but only one or these solutions is integrated into the mission planning problem at the next iteration of the method. In some embodiments, a plurality of communication problems is solved during the same iteration.

In the above embodiments, the communication problems identified by the second module are communication "black spots". In other words, a communication problem is identified if, at a certain point, it is not possible to establish a robust communication link between two entities at a certain point. However, in other embodiments, an identified problem may be a different type of problem, for example, a different type of communication problem. For example, in some embodiments, a problem may be caused by communications bandwidth limitations. For example, communications bandwidth limitations may mean that two different entities are not able to send large amounts of data to the same receiving entity at the same time. In this case, the second module may identify such problems and output a problem specification to the third module. This problem specification may include the time window in which the communication bottleneck occurs, and the contributing entities. The third module may determine a solution to the problem, for example, in the form of a mutual exclusion constraint for scheduling which specifies that two entities may not send the large amounts of data to the receiving entity at the same time. This scheduling constraint may then be incorporated in the next iteration of the task planning process.

In the above embodiments, the nonlinear constraints placed on the system are communications constraints, i.e. constraints on communications between the entities of the system.

In other embodiments, one or more of the constraints is a linear constraint.

Also, in other embodiments, one or more of the constraints is a different type of constraint. For example, in some embodiments, the nonlinear constraints placed on the system are operator workload constraints. In some embodiments, entities (e.g. UAVs) may require operator supervision (or interaction), for example, due to legal requirements. In such embodiments, a human operator may be able to supervise a plurality of entities, but may only be able to supervise a single entity at any one time. In this case, the mission planning problem may be constrained, for example, to schedule tasks such that the operator's workload is spread evenly over the duration of the mission and/or the operator does not supervise multiple entities at the same time. In such embodiments, the mission planner (i.e. the first module) may plan the mission without regard to the operator workload constraints. These plans may then be sent to an Operator Workload Module which may identify any points in the mission where the operator is overworked. Thus, in these embodiments, the second module may be a "workload planning module". The third module (i.e. the Remedial Action Planner) may then compute additional scheduling constraints so as to solve the one or the identified problems. For example, the third module may determine a scheduling constraint that provides that conflicting vehicle actions are scheduled to occur at different times, or the third module may determine a scheduling constraint that provides that supervision of an entity is passed from one operator to another operator, etc. These scheduling constraints may then be incorporated into the mission plan by the mission planner during the next iteration, and so on.

In some embodiments, the constraints on the system may relate to a different type of resource instead of or in addition to communication resources. For example, in other embodiments, the constraints on the system may be fuel or ammunition constraints.

The invention claimed is:

1. A method of determining actions to be performed by one or more physical entities such that a predetermined goal is accomplished and such that one or more predetermined constraints are satisfied, the method comprising:

using a specification of the goal, determining, by a plan determination module, an initial plan, the initial plan comprising one or more actions, each of the one or more actions being assigned to an entity, the one or more actions being such that, if each entity performed the one or more actions assigned to that entity, the goal would be accomplished;

using a specification of the one or more constraints, determining, by a plan analysis module, that one or more of the constraints would not be satisfied if the initial plan were implemented; and iteratively performing steps (i) to (v) until, at step (v), it is determined that each of the one or more predetermined constraints is satisfied, thereby providing a final plan that specifies actions to be performed by the one or more entities such that the predetermined goal is accomplished and such that the one or more predetermined constraints are satisfied; wherein step (i) comprises identifying: a part of the current plan in which a constraint is not satisfied; and a constraint that is not satisfied in the identified part of the current plan;

step (ii) comprises determining, by a remedy determination module, a remedial action or a remedial constraint, the remedial action or remedial constraint being such that, if the remedial action or remedial constraint were to be implemented, the identified constraint would be satisfied in the identified part of the current plan;

step (iii) comprises updating the current specification of the goal so as to include a specification for the determined remedial action or remedial constraint, thereby providing an updated specification of the goal;

step (iv) comprises, using the updated specification of the goal, determining, by the plan determination module, a further plan, the further plan comprising one or more further actions, each of the one or more further actions being assigned to an entity, the one or more further actions being such that, if each entity performed the one or more further actions assigned to that entity, the goal would be accomplished; and step (v) comprises, using the specification of the one or more constraints, determining, by the plan analysis module, whether or not each of the one or more constraints would be satisfied if the further plan were to be performed.

2. A method according to claim 1, the method further comprising performing, using the one or more entities, the final plan so as to accomplish the predetermined goal.

3. A method according to claim 1, wherein one or more of the entities is an unmanned vehicle.

4. A method according to claim 1, wherein the one or more predetermined constraints comprises a communication constraint relating to communication between an entity and a further entity remote from that entity.

5. A method according to claim 4, wherein the communication constraint relating to an entity specifies that a communication link between that entity and an entity remote from that entity is to be provided.

6. A method according to claim 5, wherein, if it is determined that the communication constraint is not satisfied, the step of determining the remedial action or remedial constraint comprises determining a location for a communication relay that is to provide the communication link.

7. A method according to claim 4, wherein the communication constraint relating to an entity specifies a bandwidth limitation on communications sent from or received by that entity.

8. A method according to claim 7, wherein, if it is determined that the communication constraint is not satisfied, the step of determining the remedial action or remedial constraint comprises determining a communication scheduling constraint.

9. A method according to claim 1, wherein the operation of one or more of the entities is to be at least monitored by a human operator; and the one or more predetermined constraints comprises a constraint relating to a workload of the human operator.

10. A method according to claim 9, wherein if it is determined that the constraint relating to the workload of the human operator is not satisfied, the step of determining the remedial action or remedial constraint comprises a workload scheduling constraint.

11. A method according to claim 1, wherein a step of determining a plan comprises:
using the current specification of the goal, determining a plurality of tasks, the plurality of tasks being such that if each of those tasks were performed, the goal would be accomplished;
assigning each of the tasks to an entity;
for each entity to which a task has been assigned, and for each task assigned to that entity, determining one or more actions; wherein
the one or more actions determined for an entity and for a task assigned to that entity are such that, if those actions are performed by that entity, that entity will perform that task.

12. Apparatus for determining actions to be performed by one or more physical entities such that a predetermined goal is accomplished and such that one or more predetermined constraints are satisfied, the apparatus comprising:
a plan determination module;
a plan analysis module; and
a remedy determination module; wherein
the plan determination module is configured, using a specification of the goal, to determine an initial plan, the initial plan comprising one or more actions, each of the one or more actions being assigned to an entity, the one or more actions being such that, if each entity performed the one or more actions assigned to that entity, the goal would be accomplished;
the plan analysis module configured, using a specification of the one or more constraints, to determine that one or more of the constraints would not be satisfied if the initial plan were implemented; and
the plan determination module, plan analysis module and the remedy determination module are configured to iteratively perform steps (i) to (v) until, at step (v), it is determined that each of the one or more predetermined constraints is satisfied, thereby providing a final plan that specifies actions to be performed by the one or more entities such that the predetermined goal is accomplished and such that the one or more predetermined constraints are satisfied; wherein
step (i) comprises identifying: a part of the current plan in which a constraint is not satisfied; and a constraint that is not satisfied in the identified part of the current plan;
step (ii) comprises determining, by the remedy determination module, a remedial action or a remedial constraint, the remedial action or remedial constraint being such that, if the remedial action or remedial constraint were to be implemented, the identified constraint would be satisfied in the identified part of the current plan;

step (iii) comprises updating the current specification of the goal so as to include a specification for the determined remedial action or remedial constraint, thereby providing an updated specification of the goal;
step (iv) comprises, using the updated specification of the goal, determining, by the plan determination module, a further plan, the further plan comprising one or more further actions, each of the one or more further actions being assigned to an entity, the one or more further actions being such that, if each entity performed the one or more further actions assigned to that entity, the goal would be accomplished; and
step (v) comprises, using the specification of the one or more constraints, determining, by the plan analysis module, whether or not each of the one or more constraints would be satisfied if the further plan were to be performed.

13. Apparatus according to claim 12, the apparatus further comprising an entity controller configured to control the entities so as to implement the determined further plan and thereby accomplish the predetermined goal.

14. A computer program product comprising one or more machine readable storage mediums encoding instructions that when executed by one or more processors cause a process to be carried out for determining actions to be performed by one or more physical entities such that a predetermined goal is accomplished and such that one or more predetermined constraints are satisfied, the process comprising:
using a specification of the goal, determining an initial plan, the initial plan comprising one or more actions, each of the one or more actions being assigned to an entity, the one or more actions being such that, if each entity performed the one or more actions assigned to that entity, the goal would be accomplished;
using a specification of the one or more constraints, determining that one or more of the constraints would not be satisfied if the initial plan were implemented; and
iteratively performing steps (i) to (v) until, at step (v), it is determined that each of the one or more predetermined constraints is satisfied, thereby providing a final plan that specifies actions to be performed by the one or more entities such that the predetermined goal is accomplished and such that the one or more predetermined constraints are satisfied; wherein
step (i) comprises identifying: a part of the current plan in which a constraint is not satisfied; and a constraint that is not satisfied in the identified part of the current plan;
step (ii) comprises determining a remedial action or a remedial constraint, the remedial action or remedial constraint being such that, if the remedial action or remedial constraint were to be implemented, the identified constraint would be satisfied in the identified part of the current plan;
step (iii) comprises updating the current specification of the goal so as to include a specification for the determined remedial action or remedial constraint, thereby providing an updated specification of the goal;
step (iv) comprises, using the updated specification of the goal, determining a further plan, the further plan comprising one or more further actions, each of the one or more further actions being assigned to an entity, the one or more further actions being such that, if each entity performed the one or more further actions assigned to that entity, the goal would be accomplished; and step (v) comprises, using the specification of the one or more constraints, determining whether or not each of the one or more constraints would be satisfied if the further plan were to be performed.

15. The computer program product according to claim 14, the process further comprising performing, using the one or more entities, the final plan so as to accomplish the predetermined goal.

16. The computer program product according to claim 14, wherein one or more of the entities is an unmanned vehicle.

17. The computer program product according to claim 14, wherein the one or more predetermined constraints comprises a communication constraint relating to communication between an entity and a further entity remote from that entity, and wherein the communication constraint relating to an entity specifies that a communication link between that entity and an entity remote from that entity is to be provided, and wherein, if it is determined that the communication constraint is not satisfied, the step of determining the remedial action or remedial constraint comprises determining at least one of a location for a communication relay that is to provide the communication link and a communication scheduling constraint.

18. The computer program product according to claim 14, wherein the operation of one or more of the entities is to be at least monitored by a human operator; and the one or more predetermined constraints comprises a constraint relating to a workload of the human operator.

19. The computer program product according to claim 18, wherein if it is determined that the constraint relating to the workload of the human operator is not satisfied, the step of determining the remedial action or remedial constraint comprises a workload scheduling constraint.

20. The computer program product according to claim 14, wherein a step of determining a plan comprises:
  using the current specification of the goal, determining a plurality of tasks, the plurality of tasks being such that if each of those tasks were performed, the goal would be accomplished;
  assigning each of the tasks to an entity;
  for each entity to which a task has been assigned, and for each task assigned to that entity, determining one or more actions; wherein
  the one or more actions determined for an entity and for a task assigned to that entity are such that, if those actions are performed by that entity, that entity will perform that task.

\* \* \* \* \*